United States Patent
Wolcott et al.

(10) Patent No.: US 9,203,597 B2
(45) Date of Patent: Dec. 1, 2015

(54) SYSTEMS AND METHODS FOR DUPLEX COMMUNICATION

(71) Applicant: Keyssa, Inc., Campbell, CA (US)

(72) Inventors: John Byren Wolcott, Banks, OR (US); Gary D. McCormack, Tigard, OR (US); Ian A. Kyles, West Linn, OR (US)

(73) Assignee: Keyssa, Inc., Campbell, CA (US)

( * ) Notice: Subject to any disclaimer, the term of this patent is extended or adjusted under 35 U.S.C. 154(b) by 0 days.

(21) Appl. No.: 13/784,396

(22) Filed: Mar. 4, 2013

(65) Prior Publication Data
US 2013/0308501 A1   Nov. 21, 2013

Related U.S. Application Data

(60) Provisional application No. 61/605,981, filed on Mar. 2, 2012.

(51) Int. Cl.
*H04L 5/14* (2006.01)
*G06F 13/40* (2006.01)

(52) U.S. Cl.
CPC .......... *H04L 5/1407* (2013.01); *G06F 13/4027* (2013.01)

(58) Field of Classification Search
USPC ....................................................... 370/277
See application file for complete search history.

(56) References Cited

U.S. PATENT DOCUMENTS

| 2,753,551 | A | 7/1956 | Richmond |
| 3,796,831 | A | 3/1974 | Bauer |
| 3,971,930 | A | 7/1976 | Fitzmaurice et al. |
| 4,485,312 | A | 11/1984 | Kusakabe et al. |

(Continued)

FOREIGN PATENT DOCUMENTS

| CN | 101496298 A | 7/2009 |
| EP | 0152246 A2 | 8/1985 |

(Continued)

OTHER PUBLICATIONS

Future Technology Devices International Limited (FTDI), "Technical Note TN_113 Simplified Description of USB Device Enumeration", Doc. Ref. No. FT_000180, Version 1.0, Issue Date Oct. 28, 2009, 19 pages.

(Continued)

*Primary Examiner* — Jenee Williams
(74) *Attorney, Agent, or Firm* — Fenwick & West LLP

(57) ABSTRACT

A communication device includes an EHF communication unit, a data signal line, and a protocol bridge element. The EHF communication unit includes a transceiver, and an antenna coupled to the transceiver. The data signal line carries a data signal conforming to a first communication protocol. The protocol bridge element is coupled to the data signal line and EHF communication unit, and configured to receive a first protocol-compliant data signal from the data signal line, translate the first protocol-compliant data signal to an outbound binary signal, time-compress the outbound binary signal, and transmit the outbound time-compressed signal to the transceiver. The protocol bridge element is further configured to receive an inbound time-compressed signal from the transceiver, time-decompress inbound time-compressed signal to an inbound binary signal, translate inbound binary signal to conform to a second communication protocol, and provide second protocol-compliant signal to the first data signal line.

25 Claims, 8 Drawing Sheets

(56) References Cited

U.S. PATENT DOCUMENTS

| | | | |
|---|---|---|---|
| 4,497,068 | A | 1/1985 | Fischer |
| 4,694,504 | A | 9/1987 | Porter et al. |
| 4,946,237 | A | 8/1990 | Arroyo et al. |
| 5,164,942 | A | 11/1992 | Kamerman et al. |
| 5,199,086 | A | 3/1993 | Johnson et al. |
| 5,471,668 | A | 11/1995 | Soenen et al. |
| 5,543,808 | A | 8/1996 | Feigenbaum et al. |
| 5,621,913 | A | 4/1997 | Tuttle et al. |
| 5,749,052 | A | 5/1998 | Hidem et al. |
| 5,754,948 | A | 5/1998 | Metze |
| 5,773,878 | A | 6/1998 | Lim et al. |
| 5,786,626 | A | 7/1998 | Brady et al. |
| 5,861,782 | A | 1/1999 | Saitoh |
| 5,921,783 | A | 7/1999 | Fritsch et al. |
| 5,941,729 | A | 8/1999 | Sri-Jayantha |
| 5,943,374 | A | 8/1999 | Kokuryo et al. |
| 5,956,626 | A | 9/1999 | Kaschke et al. |
| 6,072,433 | A | 6/2000 | Young et al. |
| 6,252,767 | B1 | 6/2001 | Carlson |
| 6,351,237 | B1 | 2/2002 | Martek et al. |
| 6,373,447 | B1 | 4/2002 | Rostoker et al. |
| 6,490,443 | B1 | 12/2002 | Freeny, Jr. |
| 6,492,973 | B1 | 12/2002 | Kuroki et al. |
| 6,534,784 | B2 | 3/2003 | Eliasson et al. |
| 6,542,720 | B1 | 4/2003 | Tandy |
| 6,590,544 | B1 | 7/2003 | Filipovic |
| 6,607,136 | B1 | 8/2003 | Atsman et al. |
| 6,647,246 | B1 | 11/2003 | Lu |
| 6,718,163 | B2 | 4/2004 | Tandy |
| 6,915,529 | B1 | 7/2005 | Suematsu et al. |
| 6,967,347 | B2 | 11/2005 | Estes et al. |
| 7,050,763 | B2 | 5/2006 | Stengel et al. |
| 7,107,019 | B2 | 9/2006 | Tandy |
| 7,113,087 | B1 | 9/2006 | Casebolt et al. |
| 7,213,766 | B2 | 5/2007 | Ryan et al. |
| 7,311,526 | B2 | 12/2007 | Rohrbach et al. |
| 7,512,395 | B2 | 3/2009 | Beukema et al. |
| 7,517,222 | B2 | 4/2009 | Rohrbach et al. |
| 7,593,708 | B2 | 9/2009 | Tandy |
| 7,598,923 | B2 | 10/2009 | Hardacker et al. |
| 7,599,427 | B2 | 10/2009 | Bik |
| 7,612,630 | B2 | 11/2009 | Miller |
| 7,617,342 | B2 | 11/2009 | Rofougaran |
| 7,645,143 | B2 | 1/2010 | Rohrbach et al. |
| 7,656,205 | B2 | 2/2010 | Chen et al. |
| 7,664,461 | B2 | 2/2010 | Rofougaran et al. |
| 7,760,045 | B2 | 7/2010 | Kawasaki |
| 7,761,092 | B2 | 7/2010 | Desch et al. |
| 7,768,457 | B2 | 8/2010 | Pettus et al. |
| 7,769,347 | B2 | 8/2010 | Louberg et al. |
| 7,778,621 | B2 | 8/2010 | Tandy |
| 7,791,167 | B1 | 9/2010 | Rofougaran |
| 7,820,990 | B2 | 10/2010 | Schroeder et al. |
| 7,881,675 | B1 | 2/2011 | Gazdzinski |
| 7,881,753 | B2 * | 2/2011 | Rofougaran ............... 455/562.1 |
| 7,889,022 | B2 | 2/2011 | Miller |
| 7,907,924 | B2 | 3/2011 | Kawasaki |
| 7,929,474 | B2 | 4/2011 | Pettus et al. |
| 7,975,079 | B2 | 7/2011 | Bennett et al. |
| 8,013,610 | B1 | 9/2011 | Merewether et al. |
| 8,014,416 | B2 | 9/2011 | Ho et al. |
| 8,023,886 | B2 * | 9/2011 | Rofougaran ............... 455/7 |
| 8,036,629 | B2 | 10/2011 | Tandy |
| 8,041,227 | B2 | 10/2011 | Holcombe et al. |
| 8,063,769 | B2 | 11/2011 | Rofougaran |
| 8,081,699 | B2 | 12/2011 | Siwiak et al. |
| 8,087,939 | B2 | 1/2012 | Rohrbach et al. |
| 8,121,542 | B2 | 2/2012 | Zack et al. |
| 8,131,645 | B2 | 3/2012 | Lin et al. |
| 8,183,935 | B2 | 5/2012 | Milano et al. |
| 8,244,175 | B2 * | 8/2012 | Rofougaran ............... 455/25 |
| 8,244,179 | B2 | 8/2012 | Dua |
| 8,279,611 | B2 | 10/2012 | Wong et al. |
| 8,339,258 | B2 | 12/2012 | Rofougaran |
| 8,346,847 | B2 | 1/2013 | Steakley |
| 8,422,482 | B2 * | 4/2013 | Sugita ............... 370/350 |
| 8,554,136 | B2 | 10/2013 | McCormack |
| 8,634,767 | B2 * | 1/2014 | Rofougaran et al. ............... 455/9 |
| 8,755,849 | B2 | 6/2014 | Rofougaran et al. |
| 8,794,980 | B2 | 8/2014 | McCormack |
| 8,939,773 | B2 | 1/2015 | McCormack |
| 2002/0008665 | A1 | 1/2002 | Takenoshita |
| 2002/0058484 | A1 | 5/2002 | Bobier et al. |
| 2002/0106041 | A1 | 8/2002 | Chang et al. |
| 2002/0118083 | A1 | 8/2002 | Pergande |
| 2002/0140584 | A1 | 10/2002 | Maeda et al. |
| 2003/0025626 | A1 | 2/2003 | McEwan |
| 2003/0088404 | A1 * | 5/2003 | Koyanagi ............... 704/215 |
| 2003/0137371 | A1 | 7/2003 | Saitoh et al. |
| 2004/0043734 | A1 * | 3/2004 | Hashidate ............... 455/141 |
| 2004/0214621 | A1 | 10/2004 | Ponce De Leon et al. |
| 2005/0032474 | A1 | 2/2005 | Gordon |
| 2005/0099242 | A1 | 5/2005 | Sano |
| 2005/0109841 | A1 | 5/2005 | Ryan et al. |
| 2005/0140436 | A1 | 6/2005 | Ichitsubo et al. |
| 2006/0003710 | A1 | 1/2006 | Nakagawa et al. |
| 2006/0029229 | A1 | 2/2006 | Trifonov et al. |
| 2006/0038168 | A1 | 2/2006 | Estes et al. |
| 2006/0051981 | A1 | 3/2006 | Neidlein et al. |
| 2006/0077043 | A1 | 4/2006 | Amtmann et al. |
| 2006/0082518 | A1 | 4/2006 | Ram |
| 2006/0128372 | A1 | 6/2006 | Gazzola |
| 2006/0140305 | A1 | 6/2006 | Netsell et al. |
| 2006/0159158 | A1 | 7/2006 | Moore et al. |
| 2006/0258289 | A1 | 11/2006 | Dua |
| 2006/0276157 | A1 | 12/2006 | Chen et al. |
| 2007/0024504 | A1 | 2/2007 | Matsunaga |
| 2007/0035917 | A1 | 2/2007 | Hotelling et al. |
| 2007/0063056 | A1 | 3/2007 | Gaucher et al. |
| 2007/0147425 | A1 | 6/2007 | Lamoureux et al. |
| 2007/0229270 | A1 | 10/2007 | Rofougaran |
| 2007/0242621 | A1 | 10/2007 | Nandagopalan et al. |
| 2007/0273476 | A1 | 11/2007 | Yamazaki et al. |
| 2007/0278632 | A1 | 12/2007 | Zhao et al. |
| 2008/0002652 | A1 | 1/2008 | Gupta et al. |
| 2008/0055093 | A1 | 3/2008 | Shkolnikov et al. |
| 2008/0055303 | A1 | 3/2008 | Ikeda |
| 2008/0089667 | A1 | 4/2008 | Grady et al. |
| 2008/0112101 | A1 | 5/2008 | McElwee et al. |
| 2008/0142250 | A1 | 6/2008 | Tang |
| 2008/0143435 | A1 | 6/2008 | Wilson et al. |
| 2008/0150799 | A1 | 6/2008 | Hemmi et al. |
| 2008/0150821 | A1 | 6/2008 | Koch et al. |
| 2008/0159243 | A1 | 7/2008 | Rofougaran |
| 2008/0165002 | A1 | 7/2008 | Tsuji |
| 2008/0165065 | A1 | 7/2008 | Hill et al. |
| 2008/0192726 | A1 | 8/2008 | Mahesh et al. |
| 2008/0195788 | A1 | 8/2008 | Tamir et al. |
| 2008/0197973 | A1 | 8/2008 | Enguent |
| 2008/0289426 | A1 | 11/2008 | Kearns et al. |
| 2008/0290959 | A1 | 11/2008 | Ali et al. |
| 2008/0293446 | A1 | 11/2008 | Rofougaran |
| 2009/0006677 | A1 | 1/2009 | Rofougaran |
| 2009/0009337 | A1 | 1/2009 | Rofougaran |
| 2009/0015353 | A1 | 1/2009 | Rofougaran |
| 2009/0033455 | A1 | 2/2009 | Strat et al. |
| 2009/0037628 | A1 | 2/2009 | Rofougaran |
| 2009/0073070 | A1 | 3/2009 | Rofougaran |
| 2009/0075688 | A1 | 3/2009 | Rofougaran |
| 2009/0086844 | A1 | 4/2009 | Rofougaran |
| 2009/0091486 | A1 | 4/2009 | Wiesbauer et al. |
| 2009/0094505 | A1 | 4/2009 | Lakkis |
| 2009/0098826 | A1 | 4/2009 | Zack et al. |
| 2009/0110131 | A1 | 4/2009 | Bornhoft et al. |
| 2009/0111390 | A1 | 4/2009 | Sutton et al. |
| 2009/0175323 | A1 | 7/2009 | Chung |
| 2009/0180408 | A1 * | 7/2009 | Graybeal et al. ............... 370/281 |
| 2009/0218407 | A1 | 9/2009 | Rofougaran |
| 2009/0218701 | A1 | 9/2009 | Rofougaran |
| 2009/0236701 | A1 | 9/2009 | Sun et al. |
| 2009/0239392 | A1 | 9/2009 | Sumitomo et al. |
| 2009/0239483 | A1 | 9/2009 | Rofougaran |
| 2009/0245808 | A1 | 10/2009 | Rofougaran |
| 2009/0257445 | A1 | 10/2009 | Chan et al. |

(56) References Cited

U.S. PATENT DOCUMENTS

| | | | |
|---|---|---|---|
| 2009/0280765 A1 | 11/2009 | Rofougaran et al. |
| 2009/0310649 A1 | 12/2009 | Fisher et al. |
| 2010/0009627 A1 | 1/2010 | Huomo |
| 2010/0103045 A1 | 4/2010 | Liu et al. |
| 2010/0120406 A1 | 5/2010 | Banga et al. |
| 2010/0127804 A1 | 5/2010 | Vouloumanos |
| 2010/0149149 A1 | 6/2010 | Lawther |
| 2010/0159829 A1 | 6/2010 | McCormack |
| 2010/0167645 A1 | 7/2010 | Kawashimo |
| 2010/0202345 A1 | 8/2010 | Jing et al. |
| 2010/0202499 A1 | 8/2010 | Lee et al. |
| 2010/0203833 A1 | 8/2010 | Dorsey |
| 2010/0231452 A1 | 9/2010 | Babakhani et al. |
| 2010/0260274 A1 | 10/2010 | Yamada et al. |
| 2010/0265648 A1 | 10/2010 | Hirabayashi |
| 2010/0277394 A1 | 11/2010 | Haustein et al. |
| 2010/0283700 A1 | 11/2010 | Rajanish et al. |
| 2010/0285634 A1 | 11/2010 | Rofougaran |
| 2010/0297954 A1 | 11/2010 | Rofougaran et al. |
| 2010/0315954 A1 | 12/2010 | Singh et al. |
| 2011/0038282 A1 | 2/2011 | Mihota et al. |
| 2011/0044404 A1 | 2/2011 | Vromans |
| 2011/0047588 A1 | 2/2011 | Takeuchi et al. |
| 2011/0050446 A1 | 3/2011 | Anderson et al. |
| 2011/0084398 A1 | 4/2011 | Pilard et al. |
| 2011/0092212 A1 | 4/2011 | Kubota |
| 2011/0127954 A1 | 6/2011 | Walley et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0221582 A1 | 9/2011 | Chuey et al. |
| 2011/0250928 A1 | 10/2011 | Schlub et al. |
| 2011/0285606 A1 | 11/2011 | De Graauw et al. |
| 2011/0286703 A1 | 11/2011 | Kishima et al. |
| 2011/0292972 A1 | 12/2011 | Budianu et al. |
| 2011/0311231 A1 | 12/2011 | Ridgway et al. |
| 2012/0009880 A1 | 1/2012 | Trainin et al. |
| 2012/0013499 A1 | 1/2012 | Hayata |
| 2012/0028582 A1 | 2/2012 | Tandy |
| 2012/0064664 A1 | 3/2012 | Yamazaki et al. |
| 2012/0069772 A1 | 3/2012 | Byrne et al. |
| 2012/0072620 A1 | 3/2012 | Jeong et al. |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0110635 A1 | 5/2012 | Harvey et al. |
| 2012/0126794 A1 | 5/2012 | Jensen et al. |
| 2012/0139768 A1 | 6/2012 | Loeda et al. |
| 2012/0219039 A1 | 8/2012 | Feher |
| 2012/0249366 A1 | 10/2012 | Pozgay et al. |
| 2012/0263244 A1 | 10/2012 | Kyles et al. |
| 2012/0265596 A1 | 10/2012 | Mazed et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0307932 A1 | 12/2012 | McCormack et al. |
| 2012/0319496 A1 | 12/2012 | McCormack et al. |
| 2012/0319890 A1 | 12/2012 | McCormack et al. |
| 2013/0070817 A1 | 3/2013 | McCormack et al. |
| 2013/0106673 A1 | 5/2013 | McCormack et al. |
| 2013/0109303 A1 | 5/2013 | McCormack et al. |
| 2013/0157477 A1 | 6/2013 | McCormack |
| 2013/0183903 A1 | 7/2013 | McCormack et al. |
| 2013/0196598 A1 | 8/2013 | McCormack et al. |
| 2013/0316653 A1 | 11/2013 | Kyles et al. |
| 2014/0038521 A1 | 2/2014 | McCormack |

FOREIGN PATENT DOCUMENTS

| | | |
|---|---|---|
| EP | 0 515 187 A2 | 11/1992 |
| EP | 0515187 A2 | 11/1992 |
| EP | 0789421 A2 | 8/1997 |
| EP | 0884799 A2 | 12/1998 |
| EP | 0896380 A2 | 2/1999 |
| EP | 0996189 A2 | 4/2000 |
| EP | 1041666 A1 | 10/2000 |
| EP | 1 298 809 A2 | 4/2003 |
| EP | 1357395 A1 | 10/2003 |
| EP | 1798867 A2 | 6/2007 |
| EP | 2106192 A2 | 9/2009 |
| EP | 2 309 608 A1 | 4/2011 |
| EP | 2309608 A1 | 4/2011 |
| EP | 2328226 A1 | 6/2011 |
| EP | 2 360 923 A1 | 8/2011 |
| EP | 2360923 A1 | 8/2011 |
| GB | 817349 | 7/1959 |
| GB | 2217114 | 10/1989 |
| JP | 52-72502 A | 6/1977 |
| JP | 5-236031 A | 9/1993 |
| JP | 5-327788 A | 12/1993 |
| JP | 07-006817 A | 1/1995 |
| JP | 10-13296 A | 1/1998 |
| JP | 2001-153963 A | 6/2001 |
| JP | 2001-326506 A | 11/2001 |
| JP | 2002-261514 A | 9/2002 |
| JP | 2002-265729 A | 9/2002 |
| JP | 2003-209511 A | 7/2003 |
| JP | 2003209511 A | 7/2003 |
| JP | 2004-505505 A | 2/2004 |
| JP | 2008-079241 | 4/2008 |
| JP | 2008 252566 A | 10/2008 |
| JP | 2009-231114 | 7/2009 |
| JP | 2010-183055 A | 8/2010 |
| JP | 2010-531035 A | 9/2010 |
| JP | 2011-41078 A | 2/2011 |
| JP | 2014-516221 | 7/2014 |
| WO | 97/32413 A1 | 9/1997 |
| WO | WO 97/32413 A | 9/1997 |
| WO | WO 2006/133108 A2 | 12/2006 |
| WO | 2011/114737 A1 | 9/2011 |
| WO | 2011/114738 A1 | 9/2011 |
| WO | WO 2011/114737 A1 | 9/2011 |
| WO | WO 2011/114738 A1 | 9/2011 |
| WO | 2012/129426 A3 | 9/2012 |
| WO | WO 2012/129426 A3 | 9/2012 |
| WO | 2012/155135 A3 | 11/2012 |
| WO | WO 2012/154550 A1 | 11/2012 |
| WO | WO 2012/155135 A3 | 11/2012 |
| WO | 2012/166922 A1 | 12/2012 |
| WO | 2012/174350 A1 | 12/2012 |
| WO | WO 2012/166922 A1 | 12/2012 |
| WO | WO 2012/174350 A1 | 12/2012 |
| WO | 2013/006641 A3 | 1/2013 |
| WO | WO 2013/006641 A3 | 1/2013 |
| WO | 2013/040396 A1 | 3/2013 |
| WO | WO 2013/040396 A1 | 3/2013 |
| WO | 2013/059801 A1 | 4/2013 |
| WO | 2013/059802 A1 | 4/2013 |
| WO | WO 2013/059801 A1 | 4/2013 |
| WO | WO 2013/059802 A1 | 4/2013 |
| WO | 2013/090625 A1 | 6/2013 |
| WO | WO 2013/090625 A1 | 6/2013 |
| WO | WO 2013/131095 A1 | 9/2013 |
| WO | WO 2013/134444 A1 | 9/2013 |
| WO | WO 2014/026191 A1 | 2/2014 |

OTHER PUBLICATIONS

Lee W. Young, Authorized Officer, U.S. Patent and Trademark Office, "International Search Report" in connection with related PCT Patent App. No. PCT/US2013/027835, dated May 3, 2013, 4 pages.

Lee W. Young, Authorized Officer, U.S. Patent and Trademark Office, "Written Opinion of the International Searching Authority" in connection with related PCT Patent App. No. PCT/US2013/027835, dated May 3, 2013, 8 pages.

Márquez, T. López, Authorized Officer, European Patent Office, "International Search Report" in connection with related PCT Patent App. No. PCT/US2013/029469, dated Jun. 6, 2013, 5 pages.

Márquez, T. López, Authorized Officer, European Patent Office, "Written Opinion of the International Searching Authority" in connection with related PCT Patent App. No. PCT/US2013/029469, dated Jun. 6, 2013, 5 pages.

(56) References Cited

OTHER PUBLICATIONS

Jochen Helms, Authorized Officer, European Patent Office, "International Search Report" in connection with related PCT Patent App. No. PCT/US2013/023665, dated Jun. 20, 2013, 5 pages.
Jochen Helms, Authorized Officer, European Patent Office, "Written Opinion of the International Searching Authority" in connection with related PCT Patent App. No. PCT/US2013/023665, dated Jun. 20, 2013, 10 pages.
L. L. Goldstone, "MM Wave Transmission Polarizer", International Symposium Digest—Antennas & Propagation vol. 2, Jun. 1979, 5 pages.
ECMA International, "Standard ECMA—398: Close Proximity Electric Induction Wireless Communications", Internet citation, Jun. 1, 2011, pp. 1-99.
C Nguyen Xuan Hiep, Authorized Officer, European Patent Office, "International Search Report" in connection with related PCT Patent Application No. PCT/US2013/028896, dated Sep. 26, 2013, 4 pages.
C Nguyen Xuan Hiep, Authorized Officer, European Patent Office, "Written Opinion of the International Searching Authority" in connection with related PCT Patent Application No. PCT/US2013/028896, dated Sep. 26, 2013, 4 pages.
Eric A. Juntunen, "60 GHz CMOS Pico-Joule/Bit Oook Receiver Design for Multi-Gigabit Per Second Wireless Communications" thesis paper, Aug. 2008, 52 pages.
Murcia Martinez, J., Authorized Officer, European Patent Office, "International Search Report" in connection with related Application Serial No. PCT/US2012/040214, dated Aug. 21, 2012, 3 pages.
Murcia Martinez, J., Authorized Officer, European Patent Office, "Written Opinion of the International Searching Authority" in connection with related Application Serial No. PCT/US2012/040214, dated Aug. 21, 2012, 8 pages.
Ablerga, Vito, Authorized Officer, European Patent Office, "International Search Report" in connection with related Application Serial No. PCT/US2012/042616,, dated Oct. 1, 2012, 4 pages.
Ablerga, Vito, Authorized Officer, European Patent Office, "Written Opinion of the International Searching Authority" in connection with related Application Serial No. PCT/US2012/042616,, dated Oct. 1, 2012, 10 pages.
Cortes Rosa, Joao, Authorized Officer, European Patent Office, "International Search Report" in connection with related Application No. PCT/US2012/030166, dated Oct. 31, 2010, 6 pages.
Cortes Rosa, Joao, Authorized Officer, European Patent Office, "Written Opinion of the International Searching Authority" in connection with related Application No. PCT/US2012/030166, dated Oct. 31, 2010, 9 pages.
Helms, Jochen, Authorized Officer, European Patent Office, "International Search Report" in connection with related Application No. PCT/US2012/055488, dated Dec. 13, 2012, 4 pages.
Helms, Jochen, Authorized Officer, European Patent Office, "Written Opinion of the International Searching Authority" in connection with related Application No. PCT/US2012/055488, dated Dec. 13, 2012, 8 pages.
Helms, Jochen, Authorized Officer, European Patent Office, "International Search Report" in connection with related Application No. PCT/US2012/045444, dated Jan. 21, 2013, 7 pages.
Helms, Jochen, Authorized Officer, European Patent Office, "Written Opinion of the International Searching Authority" in connection with related Application No. PCT/US2012/045444, dated Jan. 21, 2013, 9 pages.
Helms, Jochen, Authorized Officer, European Patent Office, "International Search Report" in connection with related Application No. PCT/US2012/037795, dated Jan. 21, 2013, 7 pages.
Helms, Jochen, Authorized Officer, European Patent Office, "Written Opinion of the International Searching Authority" in connection with related Application No. PCT/US2012/037795, dated Jan. 21, 2013, 12 pages.
Helms, Jochen, Authorized Officer, European Patent Office, "International Search Report" in connection with related Application No. PCT/US2012/061345, dated Jan. 24, 2013, 4 pages.
Helms, Jochen, Authorized Officer, European Patent Office, "Written Opinion of the International Searching Authority" in connection with related Application No. PCT/US2012/061345, dated Jan. 24, 2013, 7 pages.
Franz, Volker, Authorized Officer, European Patent Office, "International Search Report" in connection with related Application No. PCT/US2012/061346, dated Jan. 24, 2013, 5 pages.
Franz, Volker, Authorized Officer, European Patent Office, "Witten Opinion of the International Searching Authority" in connection with related Application No. PCT/US2012/061346, dated Jan. 24, 2013, 9 pages.
Bouhana, Emmanuel, Authorized Officer, European Patent Office, "International Search Report" in connection with related Application No. PCT/US2012/069576, dated May 2, 2013, 3 pages.
Bouhana, Emmanuel, Authorized Officer, European Patent Office, "Written Opinion of the International Searching Authority" in connection with related Application No. PCT/US2012/069576, dated May 2, 2013, 13 pages.
Bluetooth Audio Dongle Receiver 3.5mm Stereo, Feb. 8, 2013.
Bluetooth Headset, Jabra clipper, Jul. 28, 2010.
Chinese Office Action, Chinese Application No. 201280025060.8, Oct. 30, 2014, 8 pages (with concise explanation of relevance).
ECMA Standard: "Standard ECMA-398: Close Proximity Electric Induction Wireless Communications," Jun. 1, 2011, pp. 1-100, May be retrieved from the Internet<URL:http://www.ecma-international.org/publications/standards/Ecma-398.htm>.
Enumeration: How the Host Learns about Devices, Jan Axelson's Lakeview Research.
Future Technology Devices Interntional Limited (FTDI) "Technical Note TN_I 13 Simplified Description of USB Device Enumeration", Doc. Ref. No. FT_000180, Version 1.0, Issue Date Oct. 28, 2009, 19 pages.
Goldstone, L. L., "MM Wave Transmission Polarizer", International Symposium Digest—Antennas & Propagation vol. 2, Jun. 1979, 5 pages.
Japanese Office Action, Japanese Patent Office, "Notice of Reasons for Rejection" in connection with related Japanese Patent Application No. 2014-501249, dated Jul. 22, 2014, 7 pages.
Japanese Office Action, Japanese Application No. 2014-513697, Jan. 20, 2015, 7 pages.
Juntunen, E. A., "60 GHz CMOS Pico-Joule/Bit Oook Receiver Design for Multi-Gigabit Per Second Wireless Communications" thesis paper, Aug. 2008, 52 pages.
Korean Office Action, Korean Application No. 10-2013-7027865, Oct. 22, 2014, 12 pages.
Office of Engineering and Technology Federal Communications Commission, "Understanding the FCC Regulations for Low-Power, Non-Licensed Transmitters", OET Bulletin No. 63, Oct. 1993, 34 pages.
PCM510x 2VRMS DirectPath™, 112/106/IOOdB Audio Stereo DAC with 32-bit, 384kHz PCM Interface by Texas Instruments.
PCT International Search Report, PCT Patent Application No. PCT/US2013/027835, dated May 3, 2013, 4 pages.
PCT Written Opinion, PCT Patent Application No. PCT/US2013/027835, May 3, 2013, 8 pages.
PCT International Search Report, PCT Patent Application No. PCT/US2013/029469, Jun. 6, 2013, 5 pages.
PCT Written Opinion, PCT Patent Application No. PCT/US2013/029469, Jun. 6, 2013, 5 pages.
PCT International Search Report, PCT Patent Application No. PCT/US2013/023665, Jun. 20, 2013, 5 pages.
PCT Written Opinion, PCT Patent Application No. PCT/US2013/023665, Jun. 20, 2013, 10 pages.
PCT International Search Report, PCT Patent Application No. PCT/US2012/040214, Aug. 21, 2012, 3 pages.
PCT Written Opinion, PCT Patent Application No. PCT/US2012/040214, Aug. 21, 2012, 8 pages.
PCT International Search Report, PCT Patent Application No. PCT/US2012/042616, Oct. 1, 2012, 4 pages.
PCT Written Opinion, PCT Patent Application No. PCT/US2012/042616, Oct. 1, 2012, 10 pages.
PCT International Search Report, PCT Patent Application No. PCT/US2012/030166, Oct. 31, 2010, 6 pages.

(56) References Cited

OTHER PUBLICATIONS

PCT Written Opinion, PCT Patent Application No. PCT/US2012/030166, Oct. 31, 2010, 9 pages.
PCT International Search Report, PCT Patent Application No. PCT/US2012/055488, Dec. 13, 2012, 4 pages.
PCT Written Opinion, PCT Patent Application No. PCT/US2012/055488, Dec. 13, 2012, 8 pages.
PCT International Search Report, PCT Patent Application No. PCT/US2012/045444, Jan. 21, 2013, 7 pages.
PCT Written Opinion, PCT Patent Application No. PCT/US2012/045444, Jan. 21, 2013, 9 pages.
PCT International Search Report, PCT Patent Application No. PCT/US2012/037795, Jan. 21, 2013, 7 pages.
PCT Written Opinion, PCT Patent Application No. PCT/US2012/037795, Jan. 21, 2013, 12 pages.
PCT International Search Report, PCT Patent Application No. PCT/US2012/061345, Jan. 24, 2013, 4 pages.
PCT Written Opinion, PCT Patent Application No. PCT/US2012/061345, Jan. 24, 2013, 7 pages.
PCT International Search Report, PCT Patent Application No. PCT/US2012/061346, Jan. 24, 2013, 5 pages.
PCT Written Opinion, PCT Patent Application No. PCT/US2012/061346, Jan. 24, 2013, 9 pages.
PCT International Search Report, PCT Patent Application No. PCT/US2012/069576, May 2, 2013, 3 pages.
PCT Written Opinion, PCT Patent Application No. PCT/US2012/069576, May 2, 2013, 13 pages.
PCT International Search Report, PCT Patent Application No. PCT/US2013/028896, Sep. 26, 2013, 4 pages.
PCT Written Opinion, PCT Patent Application No. PCT/US2013/028896, Sep. 26, 2013, 4 pages.
PCT International Search Report, PCT Patent Application No. PCT/US2013/046631, Sep. 20, 2013, 4 pages.
PCT Written Opinion, PCT Patent Application No. PCT/US2013/046631, Sep. 20, 2013, 6 pages.
PCT International Search Report, PCT Patent Application No. PCT/US2013/054292, Nov. 29, 2013, 4 pages.
PCT Written Opinion, PCT Patent Application No. PCT/US2013/054292, Nov. 29, 2013, 7 pages.
PCT International Search Report and Written Opinion, PCT Application No. PCT/US2014/024027, Jul. 21, 2014, 15 pages.
PCT International Search Report, PCT Application No. PCT/US2013/075222, Jul. 17, 2014, 4 pages.
PCT Written Opinion, PCT Application No. PCT/US2013/075222, Jul. 17, 2014, 8 pages.
PCT International Search Report, PCT Application No. PCT/US2013/075892, Apr. 23, 2014, 4 pages.
PCT Written Opinion, PCT Application No. PCT/US2013/075892, Apr. 23, 2014, 8 pages.
PCT International Search Report and Written Opinion, PCT Application No. PCT/US2013/033394, Aug. 8, 2013, 10 pages.
PCT International Search Report and Written Opinion, PCT Application No. PCT/US2013/055487, Jan. 24, 2014, 9 pages.
PCT International Search Report and Written Opinion, PCT Application No. PCT/US2013/076687, May 21, 2014, 20 pages.
PCT International Search Report and Written Opinion, PCT Application No. PCT/US2014/030115, Sep. 22, 2014, 15 pages.
PCT International Search Report and Written Opinion, PCT Application No. PCT/US2013/059811, Dec. 2, 2013, 11 pages.
Philips, I2S Bus Specification, Jun. 5, 1996.
RF Power Amplifier, Mar. 22, 2008, 1 page, May be Retrieved at <http://en.wikipedia.org/wiki/RF_power_amplifier>.
Silicon Labs USB-to-I2S Audio Bridge Chip Brings Plug-and-Play Simplicity to Audio Design, Cision Wire, Feb. 4, 2013.
TN21065L_I2S, Interfacing I2S-Compatible Audio Devices to the ADSP-21065L Serial Ports, Apr. 1999.
USB in a NutShell . . . (43 pages).
USB Made Simple, MQP Electronics Ltd, 2006-2008 (78 pages).
"Understanding the FCC Regulations for Low-Power Non-Licensed Transmitters", Office of Engineering and Technology, Federal Communications Commission, OET Bulletin No. 63, Oct. 1993.
Universal Serial Bus, Wikipedia, 2012 (32 pages).
Vahle Electrification Systems, "CPS Contactless Power System", Catalog No. 9d/E, 2004, 12 pages.
Wireless HD: "WirelessHD Specification Version 1.1 Overview," May 1, 2010, pp. 1-95, May be retrieved from the Internet<URL:http://www.wirelesshd.org/pdfs/WirelessHD-Specification-Overview-v1.1May2010.pdf>.
United States Office Action, U.S. Appl. No. 13/485,306, Sep. 26, 2013, 11 pages.
United States Office Action, U.S. Appl. No. 13/541,543, Feb. 12, 2015, 25 pages.
United States Office Action, U.S. Appl. No. 13/541,543, Oct. 28, 2014, 42 pages.
United States Office Action, U.S. Appl. No. 13/427,576, Oct. 30, 2014, 6 pages.
United States Office Action, U.S. Appl. No. 13/524,956, Feb. 9, 2015, 17 pages.
United States Office Action, U.S. Appl. No. 13/524,963, Mar. 17, 2014, 14 pages.
United States Office Action, U.S. Appl. No. 13/657,482, Jan. 2, 2015, 29 pages.
United States Office Action, U.S. Appl. No. 12/655,041, Jun. 7, 2013, 9 pages.
United States Office Action, U.S. Appl. No. 14/047,924, Dec. 19, 2014, 8 pages.
United States Office Action, U.S. Appl. No. 14/047,924, Feb. 27, 2014, 9 pages.
United States Office Action, U.S. Appl. No. 13/760,089, Jul. 7, 2014, 14 pages.
United States Office Action, U.S. Appl. No. 14/596,172, Feb. 10, 2015, 7 pages.
United States Office Action, U.S. Appl. No. 14/462,560, Feb. 13, 2015, 12 pages.
United States Office Action, U.S. Appl. No. 14/026,913, Feb. 25, 2015, 15 pages.
Japanese Office Action, Japanese Application No. 2014-519270, Mar. 9, 2015, 17 pages.
Japanese Office Action, Japanese Application No. 2014-547442, May 25, 2015, 7 pages.
Korean Office Action, Korean Application No. 10-2013-7027865, Apr. 13, 2015, 8 pages.
Li, X. et al., "Space-Time Transmissions for Wireless Secret-Key Agreement with Information-Theoretic Secrecy," IEEE, 2003, pp. 1-5.
United States Office Action, U.S. Appl. No. 14/135,458, Apr. 13, 2015, 13 pages.
United States Office Action, U.S. Appl. No. 13/541,543, May 28, 2015, 17 pages.
United States Office Action, U.S. Appl. No. 14/047,924, May 21, 2015, 6 pages.
United States Office Action, U.S. Appl. No. 14/026,913, Jun. 5, 2015, 16 pages.
Chinese Second Office Action, Chinese Application No. 201280025060.8, Jun. 11, 2015, 8 pages.

* cited by examiner

SYSTEMS AND METHODS FOR DUPLEX COMMUNICATION

FIELD OF THE INVENTION

The present disclosure relates to systems and methods for EHF communications, and more specifically to systems and methods for duplex communication using EHF communication units.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. This additional functionality has generally included the processing of increasingly larger amounts of data at increasingly higher speeds.

Many electronic systems include multiple printed circuit boards (PCBs) upon which these high-speed ICs are mounted, and through which various signals are routed to and from the ICs. In electronic systems with at least two PCBs and a need to communicate information between those PCBs, a variety of connector and backplane architectures have been developed to facilitate information flow between the boards. Unfortunately, such connector and backplane architectures introduce a variety of impedance discontinuities into the signal path, resulting in a degradation of signal quality or integrity. Connecting to boards by conventional means, such as signal-carrying mechanical connectors, generally creates discontinuities, requiring expensive electronics to ensure effective signal communication. Conventional mechanical connectors may also wear out over time, require precise alignment and manufacturing methods, and are susceptible to mechanical jostling.

BRIEF SUMMARY

An embodiment provides a communication device. The communication device includes a first EHF communication unit configured to transmit and receive EHF signals. The first EHF communication unit includes a transceiver that is configured to receive and demodulate an inbound EHF signal into an inbound time-compressed signal, and to receive and modulate an outbound time-compressed signal into an outbound EHF signal. The transceiver further includes an antenna coupled to the transceiver configured to receive the outbound EHF signal from the tranceiver and transmit the outbound EHF signal, and to receive an inbound inbound EHF signal and provide the inbound EHF signal to the transceiver. The communication device further includes a first data signal line configured to carry a data signal conforming to a first communication protocol and a first protocol bridge element coupled to both the first data signal line and the first EHF communication unit. The first protocol bridge element is configured to receive a first protocol-compliant data signal from the first data signal line, translate the first protocol-compliant data signal to an outbound binary signal, time-compress the outbound binary signal, and transmit the outbound time-compressed signal to the transmitter. The first protocol bridge element is further configured to receive the inbound time-compressed signal from the receiver, time-decompress the inbound time-compressed signal to an inbound binary signal, translate the inbound binary signal to conform to a second communication protocol, and provide the second protocol-compliant signal to the first data signal line.

In an alternative embodiment, the communication device is configured to translate the first protocol-compliant data signal to an outbound binary signal, and transmit the outbound signal to the transmitter without applying time-compression; and receive an inbound EHF signal and demodulate it into a binary signal that is not time-compressed. The inbound and outbound binary signals may alternatively be encoded with timing and state information to facilitate contactless EHF communication. In this embodiment the EHF communication unit may be comprised of either a transmitter, a receiver or both, and may be configured such that the transmitter and receiver may each be coupled separately to an antenna.

Another embodiment provides a method for duplex communication. The method includes receiving by a first protocol bridge element, a first protocol-compliant data signal, from a first data signal line coupled to the first protocol bridge element. The method further includes translating by the first protocol bridge element, the first protocol-compliant data signal to an outbound binary signal. The method further includes time-compressing by the first protocol bridge element, the outbound binary signal to an outbound time-compressed signal. The method further more includes transmitting by the first protocol bridge element, the outbound time-compressed signal, to a transmitter of a first EHF communication unit coupled to the first protocol bridge element. The method further more includes modulating by the transmitter, the outbound time-compressed signal to an outbound EHF signal. The method furthermore includes transmitting by an antenna of the first EHF communication unit, the outbound EHF signal. The method furthermore includes receiving by the antenna, an inbound EHF signal. The method furthermore includes demodulating by a receiver of the first EHF communication unit, the inbound EHF signal to an inbound time-compressed signal. The method furthermore includes receiving by the first protocol bridge element, the inbound time-compressed signal. The method furthermore includes time-decompressing by the first protocol bridge element, the inbound time-compressed signal to an inbound binary signal. The method furthermore includes translating by the first protocol bridge element, the inbound binary signal to a second protocol-compliant data signal for providing to the first data signal line.

BRIEF DESCRIPTION OF THE SEVERAL VIEWS OF THE DRAWINGS

Figure 1:
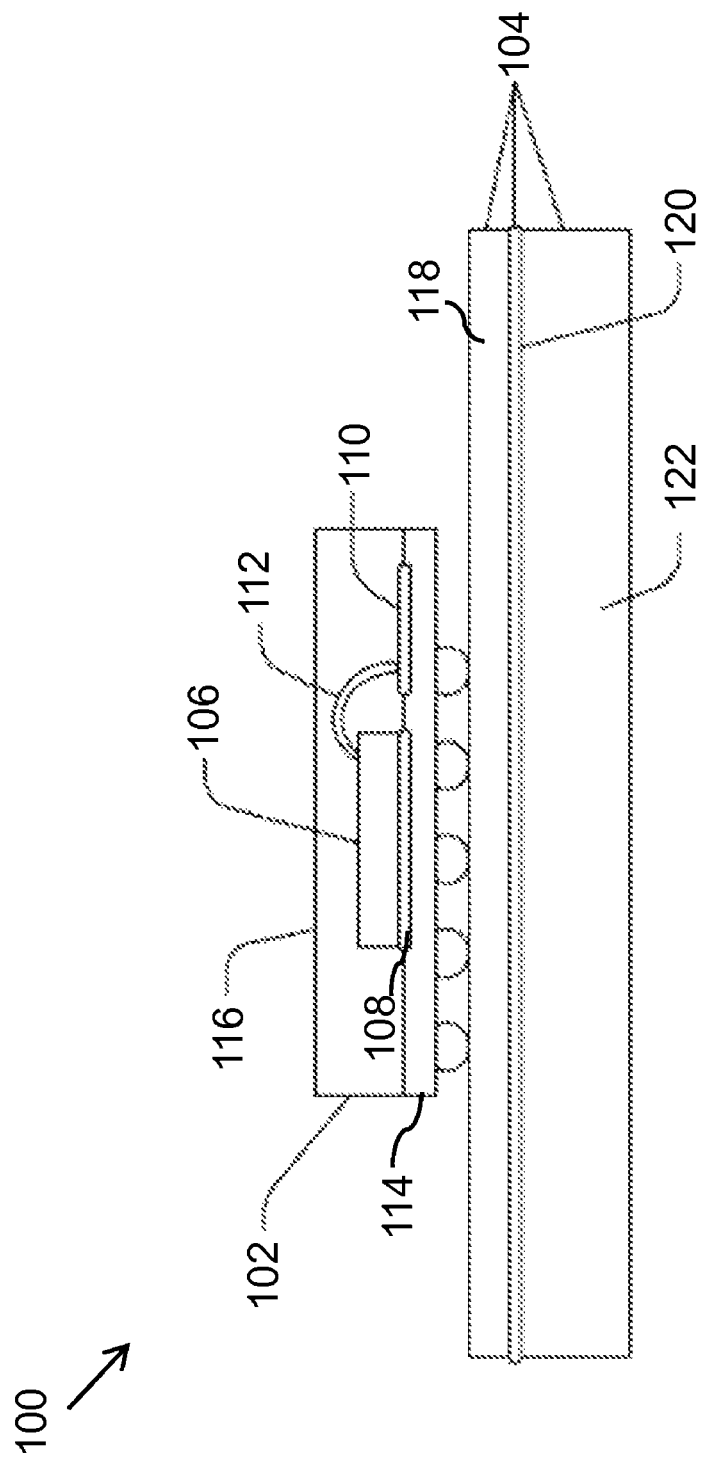
Figure 2:
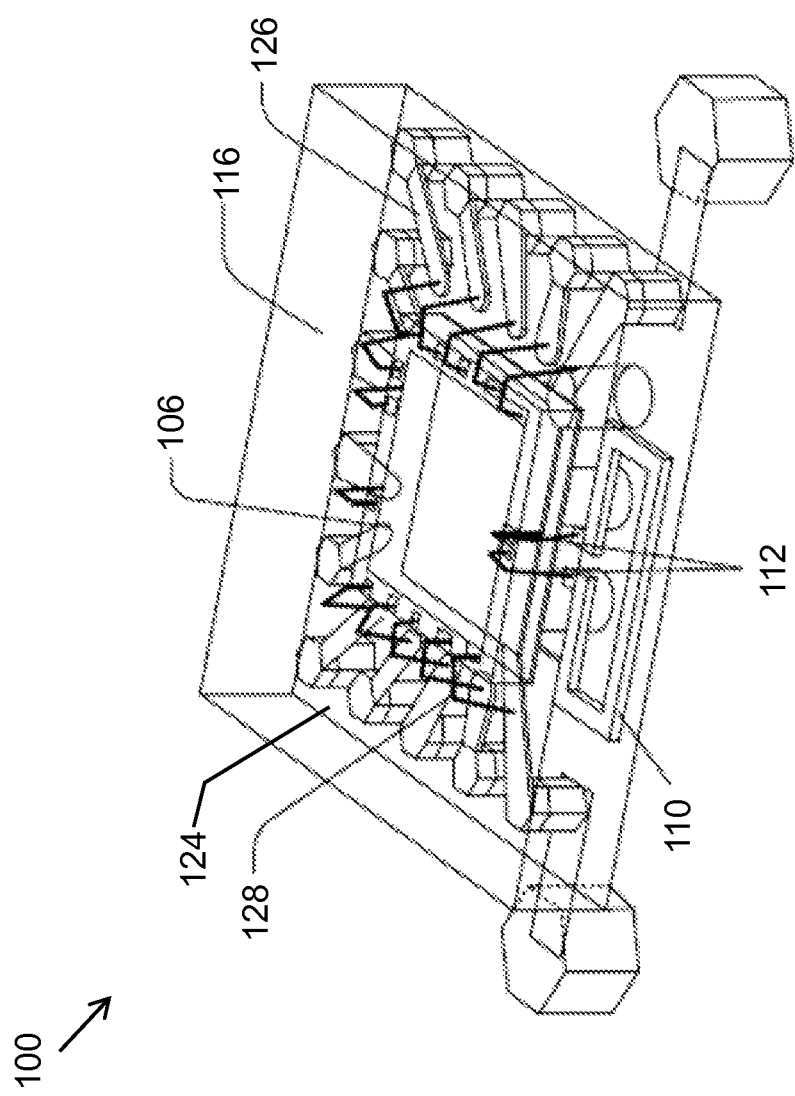
Figure 3:
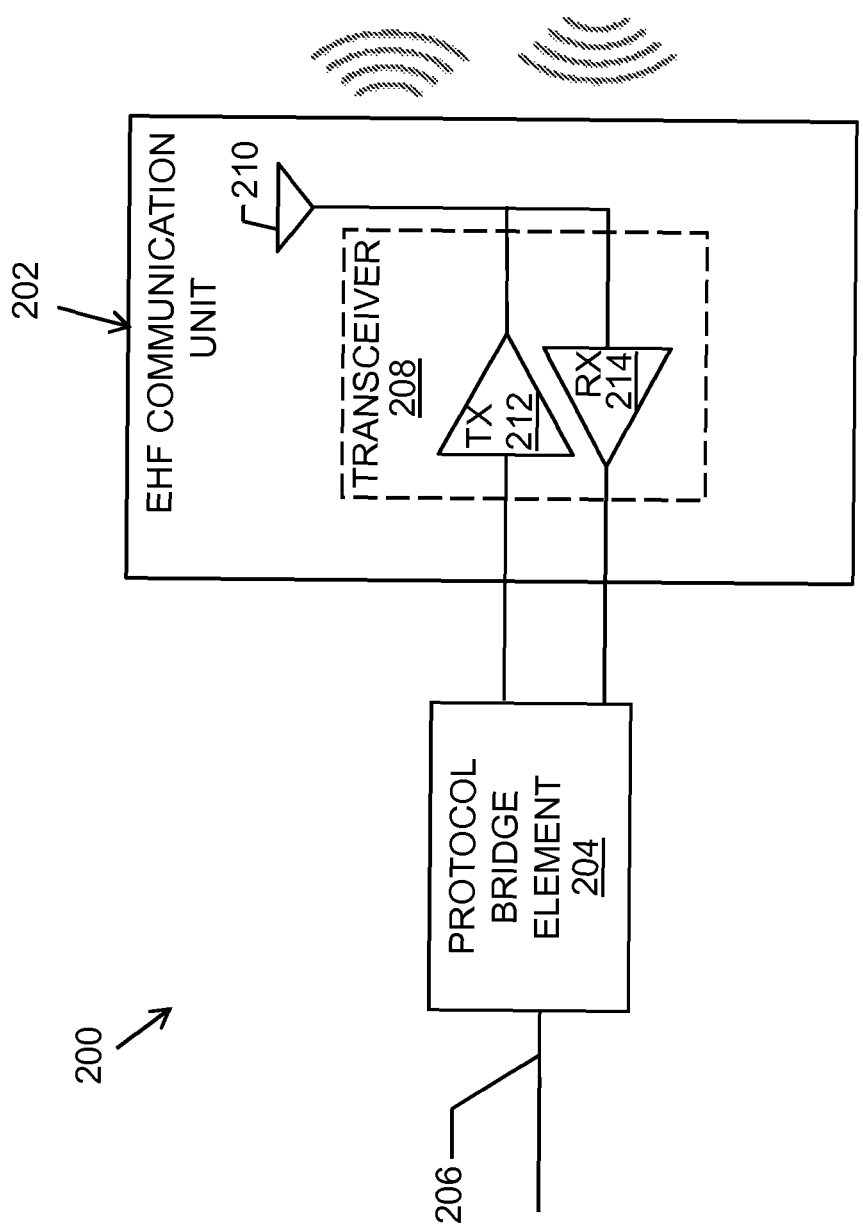
Figure 4:
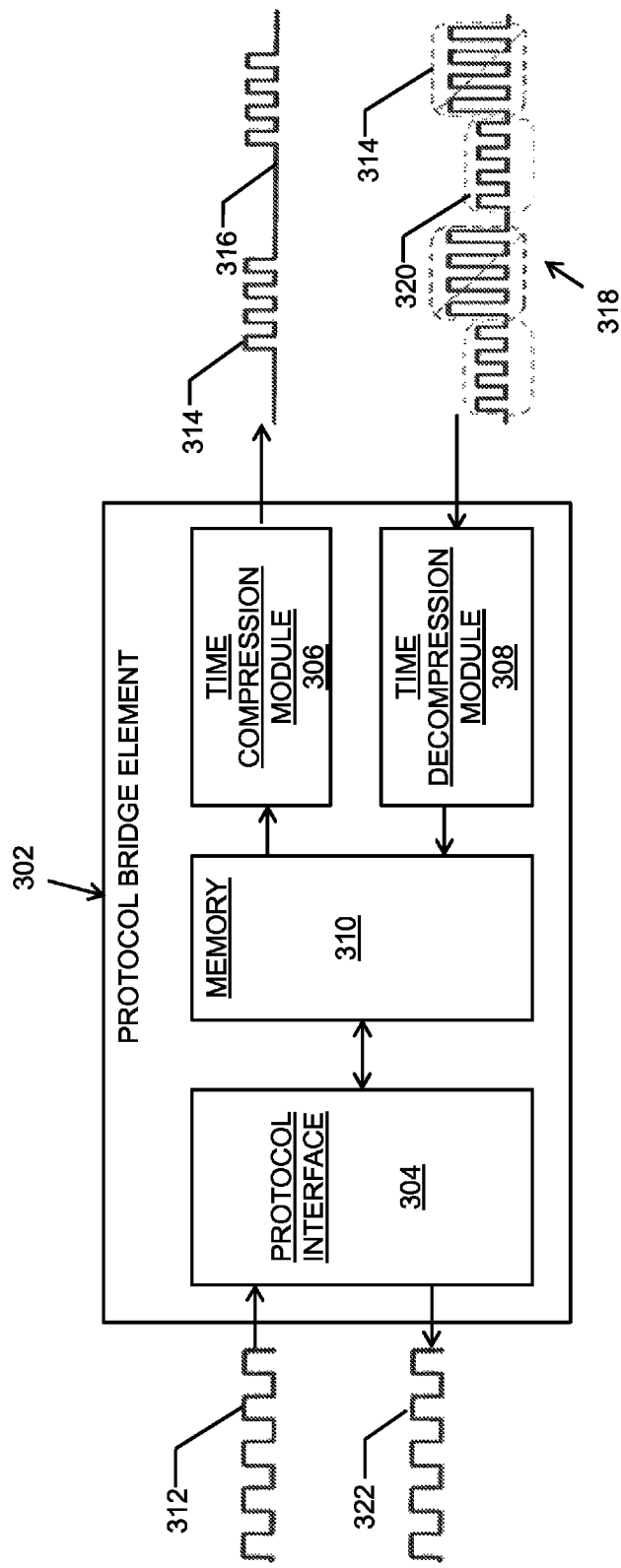
Figure 5:
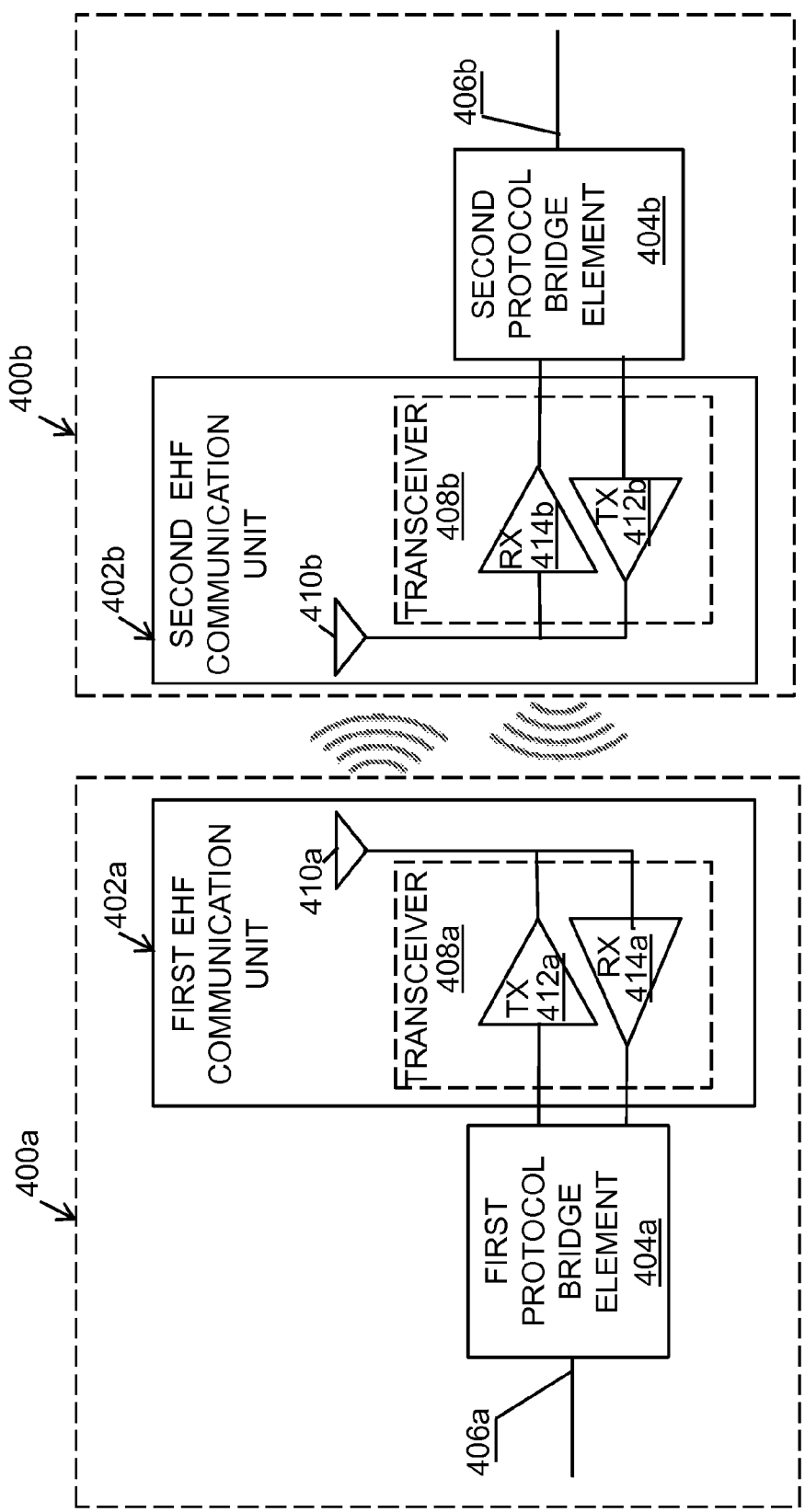
Figure 6:
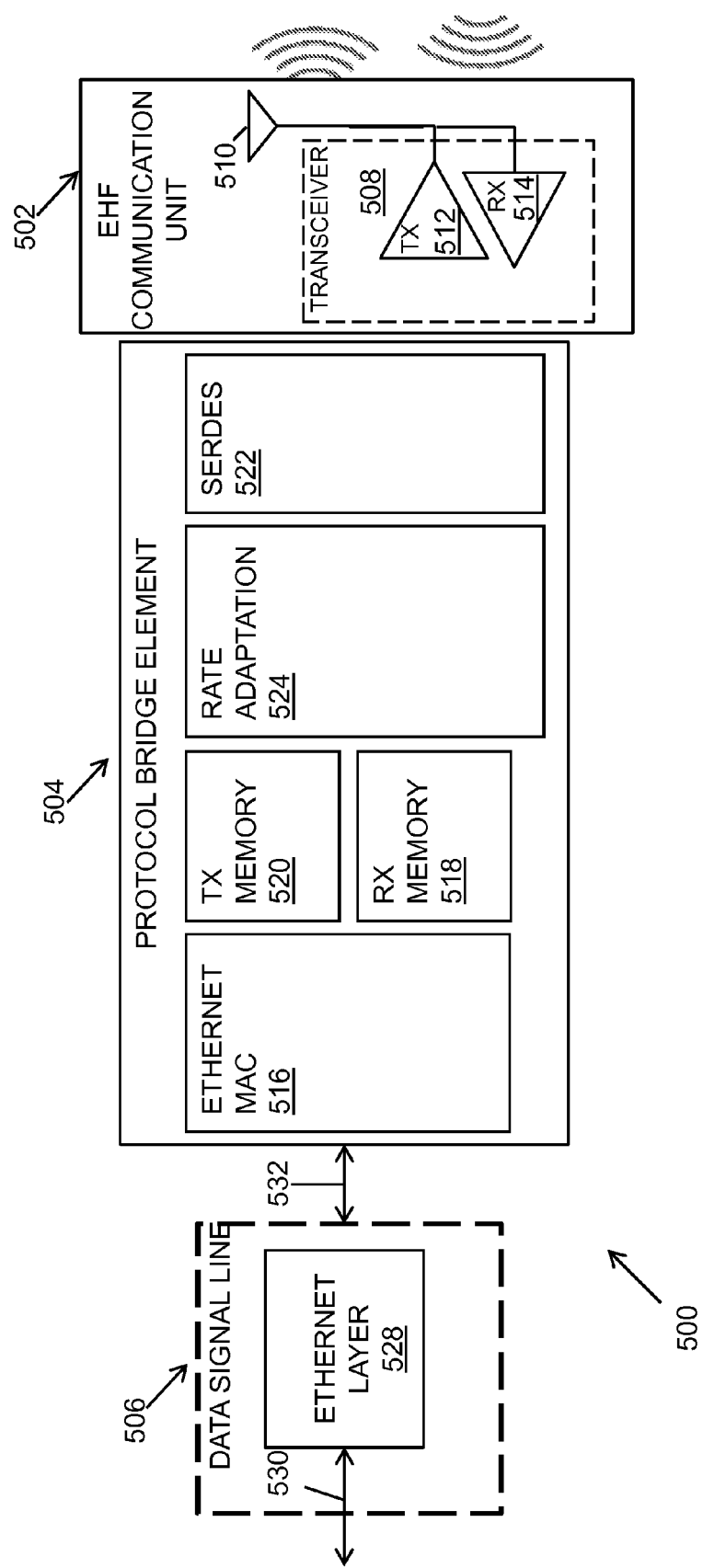
Figure 7A:
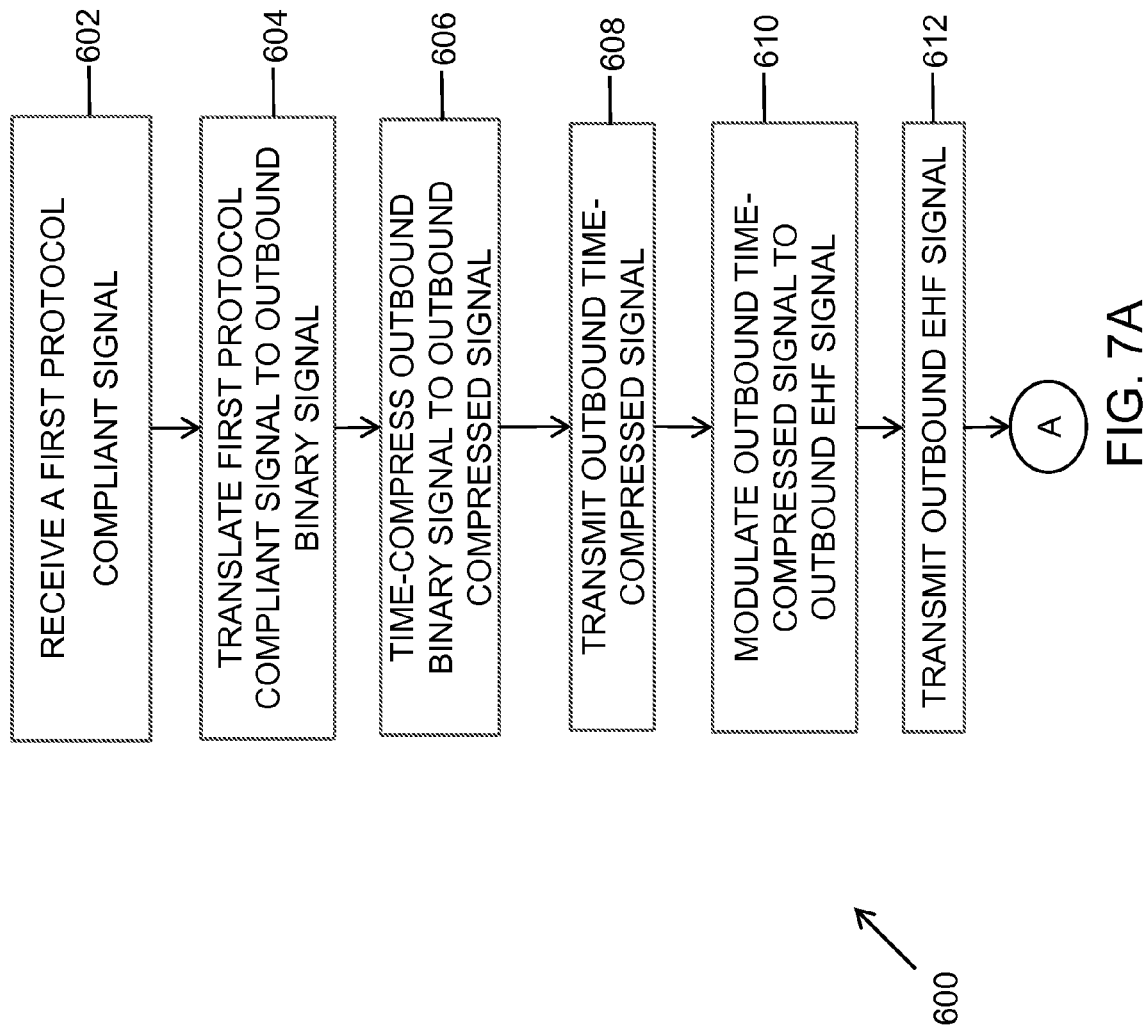
Figure 7B:
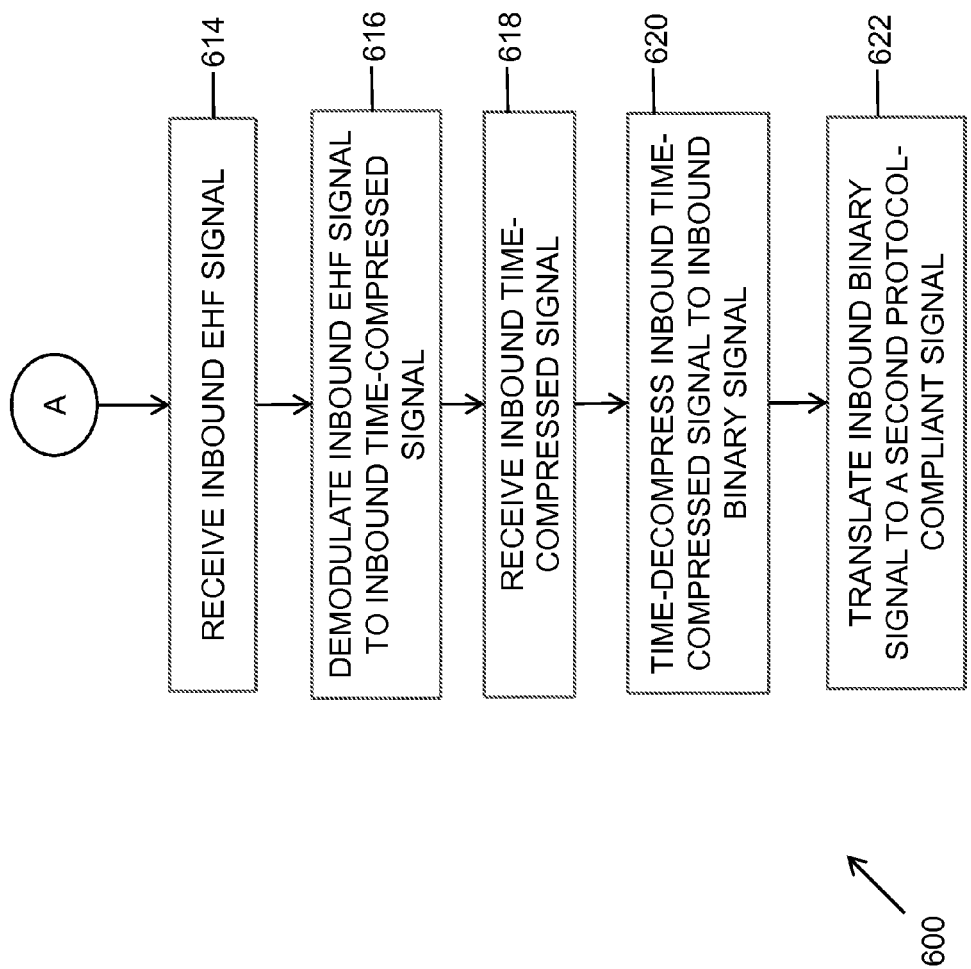

Having thus described the invention in general terms, reference will now be made to the accompanying drawings, which are not necessarily drawn to scale, and wherein:

FIG. 1 is a side view of an EHF communication unit mounted on a printed circuit board (PCB) according to an embodiment of the present invention;

FIG. 2 is a perspective view of the EHF communication unit of FIG. 1;

FIG. 3 is a schematic illustration of a communication device including a data signal, a protocol bridge element and an EHF communication unit according to an embodiment of the present invention;

FIG. 4 is a schematic illustration of the protocol bridge element of FIG. 3;

FIG. 5 is a schematic illustration of first and second EHF communication devices engaged in contactless communication with each other according to an embodiment of the present invention;

FIG. 6 is a schematic illustration of an exemplary communication device according to an embodiment of the present invention; and FIGS. 7A-7B are flow charts illustrating a method for duplex communication by a communication device according to an embodiment of the present invention.

DETAILED DESCRIPTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer-readable medium(s) having computer-readable program code embodied thereon.

The detrimental characteristics of conventional connectors lead to degradation of signal integrity and instability of electronic systems needing to transfer data at very high rates, which in turn limits the utility of such products. Methods and systems are needed for coupling discontinuous portions of high data rate signal paths without the cost and power consumption associated with insertable physical connectors and equalization circuits. Additionally, methods and systems are needed to ensure that such solutions are easily manufactured, modular, and efficient.

Examples of such systems are disclosed in U.S. Pat. No. 5,621,913 and U.S. patent application Ser. No. 12/655,041. The disclosures of these and all other publications referenced herein are incorporated by reference in their entirety for all purposes. Furthermore, in today's society and ubiquitous computing environment, high-bandwidth modular and portable memory devices are being used increasingly. Methods are therefore desirable for ensuring security and stability of communication between and within these devices. In order to provide improved secure high-bandwidth communications, the unique capabilities of EHF communications units may be utilized in innovative and useful arrangements.

An example of an EHF communications unit is an EHF comm-link chip. Throughout this disclosure, the terms comm-link chip, comm-link chip package, EHF communications unit, and EHF communication link chip package will be used interchangeably to refer to EHF antennas embedded in IC packages. Examples of such comm-link chips are described in detail in U.S. Provisional Patent Application Ser. Nos. 61/491,811, 61/467,334, and 61/485,1103, all of which are hereby incorporated in their entireties for all purposes.

FIG. 1 shows a representational side view of an EHF communication unit 100 including an IC package 102 flip-mounted to a printed circuit board (PCB) 104. The IC package 102 includes a die 106, ground plane 108, an antenna 110, bond wires, including bond wire 112, connecting the die 106 to the antenna 110. The die 106, antenna 110, and the bond wires 112 are mounted on a package substrate 114 and encapsulated in a encapsulating material 116 The ground plane 108 may be mounted to a lower surface of the die 106, and may be any suitable structure configured to provide an electrical ground for the die 106. The PCB 104 may include a top dielectric layer 118. The PCB 104 may further include a layer 120 made of conductive material forming a ground plane within the PCB 104. The PCB ground plane may be any suitable structure configured to provide an electrical ground to circuits and components on the PCB 104.

The die 106 may include any suitable structure configured as a miniaturized circuit on a suitable die substrate, and is functionally equivalent to a component also referred to as a "chip" or an "integrated circuit (IC)". The package substrate 114 may be formed using any suitable semiconductor material, such as, but not limited to, silicon. The antenna 110 may be any suitable structure configured as a transducer to convert between electrical and electromagnetic signals. The antenna 110 may be configured to operate in an Extremely High Frequency (EHF) spectrum, and may be configured to transmit and/or receive electromagnetic signals, in other words as a transmitter, a receiver, or a transceiver. Further, the encapsulating material 116 may hold the various components of the IC package 102 in fixed relative positions. The encapsulating material 116 may be any suitable material configured to provide electrical insulation and physical protection for the electrical and electronic components of the IC package 102. For example, the encapsulating material 116 may be a mold compound, glass, plastic, or ceramic. The encapsulating material 116 may be formed in any suitable shape.

FIG. 2 is a perspective view of the EHF communication unit 100 showing the die 106 mounted in electrical communication with a lead frame 124. The lead frame 124 may be any suitable arrangement of electrically conductive leads 126 configured to allow one or more other circuits to operatively connect with the die 106. The leads 126 of the lead frame 124 may be embedded or fixed in a lead frame substrate. The lead frame substrate may be formed using any suitable insulating material configured to substantially hold the leads 126 in a predetermined arrangement. The electrical communication between the die 106 and leads 126 of the lead frame 124 may be accomplished by any suitable method using conductive connectors such as, one or more bond wires 128. The bond wires 128 may be used to electrically connect points on a circuit of the die 106 with corresponding leads 126 on the lead frame 124. In another embodiment, the die 106 may be inverted and conductive connectors include bumps, or die solder balls rather than bond wires 128, which may be configured in what is commonly known as a "flip chip" arrangement.

In an embodiment, the antenna 110 may be constructed as a part of the lead frame 124. In another embodiment, the antenna 110 may be separate from, but operatively connected to the die 106 by any suitable method, and may be located adjacent to the die 106. For example, the antenna 110 may be connected to the die 106 using antenna bond wires 112. Alternatively, in a flip chip configuration, the antenna 110 may be connected to the die 106 without the use of the antenna bond wires 112. It may be noted that locating an antenna 110 within the IC package 102 reduces burden on the user, allows taking advantage of PCB characteristics, and creates less risk of damage to the antenna 110.

The encapsulating material 116 may be in the form of a rectangular block, encapsulating the die 106, the antenna 110, the lead frame 124, the leads 126, the bond wires 112 and 128, except the unconnected leads of the lead frame 124. One or more external connections may be formed between the encapsulated material 116 and other circuits or components. For example, external connections may include ball pads and/or external solder balls for connection to the PCB 104.

FIG. 3 is a schematic illustration of a communication device 200 including an EHF communication unit 202, a protocol bridge element 204, and a data signal line 206. The EHF communication unit 202 includes a transceiver 208 and an antenna 210 coupled to the transceiver. It may be noted that the EHF communication unit 100 (illustrated in FIGS. 1 and 2) may be used to fulfill the structure and functions described for the EHF communication unit 202. The die 106 and the antenna 110 of the EHF communication unit 100 may include the transceiver 208 and the antenna 210 respectively. The protocol bridge element 204 may be disposed on the same die as the EHF communication unit 202. Alternatively, the protocol bridge element 204 may be disposed on a different die that is electronically coupled to the EHF communication unit 202.

The transceiver 208 includes a transmitter 212, and a receiver 214. The antenna 210 may receive an inbound EHF signal and provide the inbound EHF signal to the receiver 214. In one embodiment, the antenna 210 may receive the outbound EHF signal from the transmitter 212. In another embodiment, the antenna may receive the inbound EHF signal from another EHF communication unit (not shown). The antenna 210 may also receive an outbound EHF signal from the transmitter 212, and then transmit the outbound EHF signal, for example to another EHF communication unit (not shown).

In one embodiment, as exemplified herein, an antenna 210 is coupled to both the transmitter 212 and receiver 214 and configured to both receive inbound EHF signals and transmit outbound EHF signals. In an alternative embodiment, transmitter 212 is coupled to a first antenna configured to transmit the outbound EHF signal, and the receiver 214 is coupled to a second antenna configured to receive an inbound EHF signal. In the exemplary embodiments of the present disclosure, reference to "an antenna" should be considered to single dual-purpose antennas as well as pairs of single-purpose antennas.

The data signal line 206 may include one or more communication channels provided over one or more communication or signal paths, and may carry one or more data signals conforming to a communication protocol which may be comprised of any standard or non-standard single or multi-wire protocol signaling. As used herein, the term data signal includes both singular or multiple data signals. Selected examples of communication protocols may include a Universal Serial Bus (USB) protocol, a Serial Advanced Technology Attachment (SATA) protocol, an Ethernet protocol, an Integrated Interchip Sound (I2S) protocol (or Inter-IC Sound protocol), an Inter-Integrated Circuit (I2C) protocol, a DisplayPort (DP) protocol, a Mobile High-Definition Link (MHL) protocol, a High-Definition Multimedia Interface (HDMI) protocol, a Fibre Channel (FC) protocol, a Peripheral Component Interconnect Express (PCIe) protocol, a Thunderbolt protocol, a HyperTransport (HT) protocol, a QuickPath Interconnect (QPI) protocol, a RapidIO (RIO) protocol, a Serial Attached SCSI (SAS) protocol, a Serial Digital Interface (SDI) protocol, a Secure Digital (SD) protocol, a Secure Digital Input Output (SDIO) protocol, and a Controller Area Network (CAN) protocol, as well as a variety of alternative standard and/or non-standard communications protocols. In a preferred embodiment, the data signal line may carry one or more data signals conforming to a communication protocol that is a Universal Serial Bus (USB) protocol, an Ethernet protocol, an Integrated Interchip Sound (I2S) protocol (or Inter-IC Sound protocol), a Peripheral Component Interconnect Express (PCIe) protocol, or a DisplayPort (DP) protocol.

The protocol bridge element 204 may be a circuit or circuits in communication with the data signal line 206 and the EHF communication unit 202 through one or more communication paths, and configured to translate a plurality of communication protocols.

The protocol bridge element 204 may receive a first protocol-compliant data signal from the data signal line 206 and translate the first protocol-compliant data signal to an outbound binary signal. The protocol bridge element 204 may further time-compress the outbound binary signal to an outbound time-compressed signal, and transmit the outbound time-compressed signal to the transmitter 212. The transmitter 212 may receive and modulate the outbound time-compressed signal into an outbound EHF signal that is then sent to antenna 210.

The receiver 214 may receive and demodulate an inbound EHF signal into an inbound time-compressed signal. The protocol bridge element 204 may receive the inbound time-compressed signal from the receiver 214 and time-decompress the inbound time-compressed signal to an inbound binary signal. The protocol bridge element 204 may further translate the inbound binary signal to conform to a second communication protocol, and provide the second protocol-compliant signal to the data signal line 206. In one embodiment, the first and second communication protocols are the same. In another embodiment, the first and second communication protocols are different from each other.

In an embodiment of the present invention, the outbound EHF signal transmitted by the transmitter 212 is received by the receiver 214. Thus, the outbound EHF signal of the transmitter 212 is similar to the inbound EHF signal of the receiver 214, and the protocol bridge element 204 facilitates modification of the communication protocol of the first protocol-compliant data signal by receiving the first protocol-compliant signal from the data signal line 206, and providing the second protocol-compliant signal to the data signal line 206.

In another embodiment of the invention, communication device 200 of FIG. 3 is configured to facilitate the transport of an I2S protocol via contactless EHF communication. In this embodiment, the first protocol-compliant data signal received from data signal line 206 may include clock, data, and word select signals that conform to the I2S standard protocol. The protocol bridge element 204 may include suitable functionality to translate the first I2S protocol-compliant signal into an outbound binary signal that is then transmitted to transmitter 212.

The protocol bridge element 204 optionally may encode the outbound serial binary data signal to include timing and state information using a suitable encoding scheme, such as Manchester or pulse width modulation (PWM) encoding, among others, before transmitting the encoded data stream to the transmitter 212.

Additionally or in the alternative, the communication device 200 may be configured to receive an inbound, encoded serial binary data signal and translate the serial binary data signal using an appropriate decoding scheme, such as Manchester or PWM decoding techniques, among others, and provide the resulting second I2S protocol-compliant signal (including the appropriate clock, data and word select signals) to the data signal line 206, In another embodiment the data signals may conform to a serial binary data format and may be transmitted and received via contactless EHF communication without the need for encoding or decoding. It may be noted that the application of encoding and decoding may not be required in a symmetrical manner depending on the communication protocol such that one direction may require translation and encoding onto a serial binary stream while the other direction may not.

FIG. 4 is a schematic illustration of a protocol bridge element 302, which is an example of the protocol bridge element 204. The protocol bridge element 302 includes a protocol interface 304, a time-compression module 306, and a time-decompression module 308, and a memory 310, interconnected to each other.

The protocol interface 304 may receive a first protocol-compliant data signal 312 from a data signal line (not shown), and translate the first protocol-compliant data signal 312 to an outbound binary signal. The time-compression module 306 may receive and time-compress the outbound binary signal to an outbound time-compressed signal 314. The time-compression module 306 may transmit the outbound time-compressed signal 314 to a transmitter (not shown). In various embodiments, the time-compression module 306 transmits the outbound time-compressed signal 314 in time-spaced bursts alternating with intervals of blanking data 316, which may consist of a series of binary zeroes. The time-compression module 306 provides the outbound time-compressed signal 314 in time-spaced bursts, with a duty cycle that allows the same amount of data to be transmitted in the same overall amount of time using time-division multiplexing, but with regular gaps or dead times 316. The time-compression module 306 may further provide a marker pattern in each burst to indicate a start and an end of each burst. The marker pattern may optionally be stored in memory 310. In an exemplary embodiment, the time-compression module 306 includes a rate-multiplier that compresses the outbound binary signal. For example, the rate-multiplier may compress the outbound binary signal so that the rate of transmission of the outbound time-compressed signal 314 is at least double the rate of transmission of the data signal 312.

The time-decompression module 308 may be configured to receive a time-compressed signal 318. In an embodiment, the time-compressed signal 318 includes a combination of an inbound time-compressed signal 320 from a receiver coupled to the protocol bridge element 302 and the outbound time-compressed signal 314 transmitted by the time-compression module 306. The inbound time-compressed signal 320 and the outbound time-compressed signal 314 may be synchronously interleaved with each other using various interleaving techniques, to accomplish transmission and reception of data by the protocol bridge element 302 in alternating fashion, with minimal overlap. That is, the inbound time-compressed signal 320 and the outbound time-compressed signal 314 are rendered distinguishable by variation in time.

In one or more alternative embodiments, inbound and outbound time-compressed signals may be distinguished by manipulation of other properties of the signal, including but not limited to variation in frequency, phase, amplitude, signal polarity, or various combinations thereof. In such embodiments, time-compression module 306 would be replaced by a module capable of manipulating the desired signal property so that it became readily separable, while time-decompression module 308 would be replaced by an appropriate module capable of reversing such manipulation.

The time-decompression module 308 uses the marker pattern in each burst of the outbound time-compressed signal 316 to detect and pull out only the inbound time-compressed signal 320 from the time-compressed signal 318, and discards the outbound time-compressed signal 314. Thereafter, the time-decompression module 308 decompresses the inbound time-compressed signal 320 to the inbound binary signal. The protocol interface 304 may translate the inbound binary signal to a second protocol-compliant data signal 322, and transmit the second protocol-compliant data signal 322 to the data signal line (not shown). In an exemplary embodiment, the time-decompression module 308 includes a deserializer that performs the time-decompression of the inbound time-compressed signal 320, and optionally extracts only the inbound time-compressed signal 320 from the signal 318.

The memory 310 includes a memory storage element coupled to the protocol interface 304, the time-compression module 306, and the time-decompression module 308. Examples of memory 310 include, but are not limited to, first-in-first-out (FIFO) or other Random Access Memory (RAM) implementations. The memory 310 may be a first-in-first-out (FIFO) memory storage element, and store representations of the first and second protocol-compliant signals 312 and 322, inbound and outbound binary signals, and the inbound and outbound time-compressed signals 314 and 318.

FIG. 5 is a schematic illustration of first and second communication devices 400a and 400b engaged in contactless EHF communication with each other. The first and second communication devices 400a and 400b are examples of the communication device 200. The first communication device 400a includes a first EHF communication unit 402a, a first protocol bridge element 404a, and a first data signal line 406a. The second communication device 400b may include a second EHF communication unit 402b, a second protocol bridge element 404b, and a second data signal line 406b.

The first protocol bridge element 404a may receive a first protocol-compliant data signal from the first data signal line 406a and translate the first protocol-compliant data signal into a first outbound binary signal. The first protocol bridge element 404a may further time-compress the first outbound binary signal to a first outbound time-compressed signal, and transmit the first outbound time-compressed signal to a first transmitter (Tx) 412a. The first transmitter 412a may receive and modulate the first outbound time-compressed signal into a first outbound EHF signal. A first antenna 410a may transmit the first outbound EHF signal. A second antenna 410b receives the first outbound EHF signal and transmits it to a second receiver (Rx) 414b of the second EHF communication unit 402b. The first outbound EHF signal acts as a second inbound EHF signal for the second receiver 414b. The second receiver 414b may convert the second inbound EHF signal to a second inbound time-compressed signal. The second protocol bridge element 404b may receive the second inbound time-compressed signal from the second receiver 414b, and time-decompress the second inbound time-compressed signal to a second inbound binary signal. The second protocol bridge element 404b may further translate the second inbound binary signal to conform to a second communication protocol, and provide the second protocol-compliant signal to the second data signal line 406b. Therefore, the first and second protocol bridge elements 404a and 404b enable contactless EHF communication between the first and second data signal lines 406a and 406b via the first and second EHF communication units 402a and 402b.

FIG. 6 is a schematic illustration of an exemplary communication device 500, which is an example of the communication device 200. The communication device 500 includes an EHF communication unit 502, a protocol bridge element 504, and a data signal line 506. The data signal line 506 may include one or more individual physical data connections 530 (for example, a CAT5 cable) coupled to a typical Ethernet physical layer element 528. The Ethernet physical layer element 528 is, in turn, coupled to the protocol bridge element

504 using a compatible interface 532, such as for example a Gigabit Media Independent Interface (GMII), among others.

The protocol bridge element 504 may include the Ethernet media access control (MAC) 516, a receiver (RX) memory module 518, a transmitter (TX) memory module 520, a serializer/deserializer circuit (SERDES) 522, and a rate adaptation module 524. The Ethernet MAC 516, the RX memory module 518, the TX memory module 520, together include suitable memory and protocol interface functionality. Further, the SERDES 522 may include a rate multiplier and a deserializer, and the SERDES 522 and the rate adaptation module 524 together include suitable time-compression and time-decompression functionality.

FIGS. 7A-7B are flow charts illustrating a method 600 for duplex communication by a communication device 200. As discussed with reference to FIG. 3, the communication device 200 includes the EHF communication unit 202, the protocol bridge element 204, and the data signal line 206. The EHF communication unit 202 includes the antenna 210, the transmitter 212 and the receiver 214. At step 602, a first protocol-compliant data signal is received by the protocol bridge element 204 from the data signal line 206. At step 604, the first protocol-compliant data signal is translated to an outbound binary signal by the protocol bridge element 204. At step 606, the outbound binary signal is time-compressed to an outbound time-compressed signal by the protocol bridge element 204. At step 608, the outbound time-compressed signal is transmitted by the protocol bridge element 204 to the transmitter 212. At step 610, the outbound time-compressed signal is modulated to an outbound EHF signal by the transmitter 212. At step 612, the outbound EHF signal is transmitted by the antenna 210.

At step 614, an inbound EHF signal is received by the antenna 610. In one embodiment, the inbound EHF signal is received from the transmitter 212, and is similar to the outbound EHF signal. In another embodiment, the inbound EHF signal is received from a transmitter of an external device (not shown). At step 616, the inbound EHF signal is demodulated to an inbound time-compressed signal by the receiver 214. At step 618, the inbound time-compressed signal is received by the protocol bridge element 204. At step 620, the inbound time-compressed signal is time-decompressed to an inbound binary signal by the protocol bridge element 204. Finally, at step 622, the inbound binary signal is translated to a second protocol-compliant data signal by the protocol bridge element 204, for providing to the data signal line 206.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A communication device comprising:
a first extremely high frequency (EHF) communication unit configured to transmit and receive EHF signals, wherein the first EHF communication unit comprises:
a transceiver configured to receive and demodulate an inbound EHF signal into an inbound time-compressed signal, and to receive and modulate an outbound time-compressed signal into an outbound EHF signal; and
an antenna coupled to the transceiver configured to receive the outbound EHF signal from the transceiver and transmit the outbound EHF signal, and to receive an inbound EHF signal and provide the inbound EHF signal to the transceiver;
a first data signal line configured to carry a data signal conforming to a first communication protocol; and
a first protocol bridge element coupled to both the first data signal line and the first EHF communication unit, and configured to:
receive a first protocol-compliant data signal from the first data signal line, translate the first protocol-compliant data signal to an outbound binary signal, time-compress the outbound binary signal, and transmit the outbound time compressed signal to the transceiver; and
receive the inbound time-compressed signal from the transceiver, time decompress the inbound time-compressed signal to an inbound binary signal, translate the inbound binary signal to conform to a second communication protocol, and provide a second protocol-compliant signal to the first data signal line.

2. The communication device of claim 1, wherein the transceiver includes a receiver configured to receive and demodulate the inbound EHF signal into the inbound time compressed signal; and a transmitter configured to receive and modulate the outbound time-compressed signal into the outbound EHF signal; and the antenna is coupled to both the receiver and the transmitter.

3. The communication device of claim 2, wherein the first protocol bridge element further comprises:
a protocol interface configured to transmit and receive the first and second protocol-compliant data signals to and from the first data signal line, and translate the first and second protocol-compliant data signals to outbound and inbound binary signals respectively, and vice versa;
a time-compression module coupled to the protocol interface, and configured to receive and time-compress the outbound binary signal, and transmit the outbound time-compressed signal to the transmitter; and
a time-decompression module coupled to the protocol interface, and configured to receive the inbound time-compressed signal from the receiver, decompress the inbound time-compressed signal to the inbound binary signal, and provide the inbound binary signal to the protocol interface.

4. The communication device of claim 3, further comprising a memory storage element coupled to the protocol interface, the time-compression module, and the time-decompression module.

5. The communication device of claim 3, wherein the time-compression module includes a rate multiplier to time-compress the outbound binary signal.

6. The communication device of claim 5, wherein the rate multiplier provides the outbound time-compressed signal to the transmitter using time-division multiplexing as time-spaced bursts.

7. The communication device of claim 6, wherein the rate multiplier provides a marker pattern in each burst to indicate a start and an end of each burst.

8. The communication device of claim 6, wherein the rate multiplier provides the outbound time-compressed signal as a series of time-spaced bursts alternating with intervals of blanking data.

9. The communication device of claim 6, wherein the first protocol bridge element distinguishes the outbound time-compressed signal from the inbound time-compressed signal by variation in time.

10. The communication device of claim 3, wherein the time-decompression module includes a deserializer to decompress and extract the inbound time-compressed signal.

11. The communication device of claim 1, wherein at least one of the first communication protocol and the second communication protocol includes one of a Universal Serial Bus (USB) protocol, a Serial Advanced Technology Attachment (SATA) protocol, an Ethernet protocol, an Integrated Interchip Sound (I2S) protocol (or Inter-IC Sound protocol), an Inter-Integrated Circuit (I2C) protocol, a DisplayPort (DP) protocol, a Mobile High-Definition Link (MHL) protocol, a High-Definition Multimedia Interface (HDMI) protocol, a Fibre Channel (FC) protocol, a Peripheral Component Interconnect Express (PCIe) protocol, a Thunderbolt protocol, a HyperTransport (HT) protocol, a QuickPath Interconnect (QPI) protocol, a RapidIO (RIO) protocol, a Serial Attached SCSI (SAS) protocol, a Serial Digital Interface (SDI) protocol, a Secure Digital (SD) protocol, a Secure Digital Input Output (SDIO) protocol, and a Controller Area Network (CAN) protocol.

12. The communication device of claim 11, wherein each of the first communication protocol and the second communication protocol includes one of a Universal Serial Bus (USB) protocol, an Ethernet protocol, an Integrated Interchip Sound (I2S) protocol (or Inter-IC Sound protocol), a Peripheral Component Interconnect Express (PCIe) protocol, or a DisplayPort (DP) protocol.

13. The communication device of claim 1, wherein the first communication and second communication protocol are same.

14. The communication device of claim 1, wherein the first data signal line includes one or more communication channels provided over one or more signal paths.

15. The communication device of claim 1, wherein the first protocol bridge element is configured to communicate with the first EHF communication unit through one or more communication channels provided over one or more signal paths.

16. The communication device of claim 1, further comprising:
a second EHF communication unit, which may be the same or different from the first EHF communication unit;
a second data signal line, which may be the same or different from the first data signal line, and which is configured to carry a data signal conforming to a second communication protocol; and
a second protocol bridge element, which may be the same or different from the first protocol bridge element, and which is coupled to the second data signal line and the second EHF communication unit,
wherein the first and second protocol bridge elements are configured to enable contactless EHF communication between the first and second data signal lines via the first and second EHF communication units.

17. A method for duplex communication, comprising:
receiving, by a first protocol bridge element, a first protocol-compliant data signal, from a first data signal line coupled to the first protocol bridge element;
translating, by the first protocol bridge element, the first protocol-compliant data signal to an outbound binary signal;
time-compressing, by the first protocol bridge element, the outbound binary signal to an outbound time-compressed signal;
transmitting, by the first protocol bridge element, the outbound time-compressed signal, to a transmitter of a first extremely high frequency (EHF) communication unit coupled to the first protocol bridge element;
modulating, by the transmitter, the outbound time-compressed signal to an outbound EHF signal;
transmitting, by an antenna of the first EHF communication unit, the outbound EHF signal;
receiving, by the antenna, an inbound EHF signal;
demodulating, by a receiver of the first EHF communication unit, the inbound EHF signal to an inbound time-compressed signal;
receiving, by the first protocol bridge element, the inbound time-compressed signal;
time-decompressing, by the first protocol bridge element, the inbound time compressed signal to an inbound binary signal; and
translating, by the first protocol bridge element, the inbound binary signal to a second protocol-compliant data signal for providing to the first data signal line.

18. The method of claim 17 further comprising:
transmitting, by the first protocol bridge element, the outbound time-compressed signal in one or more outbound bursts;
receiving, by the first protocol bridge element, the inbound time-compressed signal in one or more inbound bursts; and
synchronizing, by the first protocol bridge element, the inbound bursts and the outbound bursts to substantially prevent overlap of the inbound and outbound time-compressed signals.

19. The method of claim 18 further comprising separating the one or more outbound bursts with blanking data.

20. The method of claim 18 further comprising distinguishing, by the first protocol bridge element, the outbound time-compressed signal from an inbound time-compressed signal time variation.

21. The method of claim 20, wherein synchronizing the inbound bursts and the outbound bursts includes providing a marker pattern in each burst to indicate a start and an end of each burst.

22. The method of claim 17, wherein at least one of the first protocol-compliant data signal and second protocol-compliant data signal is compliant with a communication protocol that is a Universal Serial Bus (USB) protocol, a Serial Advanced Technology Attachment (SATA) protocol, an Ethernet protocol, an Integrated Interchip Sound (I2S) protocol (or Inter-IC Sound protocol), an Inter-Integrated Circuit (I2C) protocol, a DisplayPort (DP) protocol, a Mobile High-Definition Link (MHL) protocol, a HighDefinition Multimedia Interface (HDMI) protocol, a Fibre Channel (FC) protocol, a Peripheral Component Interconnect Express (PCIe) protocol, a Thunderbolt protocol, a HyperTransport (HT) protocol, a QuickPath Interconnect (QPI) protocol, a RapidIO (RIO) protocol, a Serial Attached SCSI (SAS) protocol, a Serial Digital Interface (SDI) protocol, a Secure Digital (SD)

protocol, a Secure Digital Input Output (SDIO) protocol, or a Controller Area Network (CAN) protocol.

23. The method of claim 22, wherein each of the first protocol-compliant data signal and second protocol-compliant data signal is compliant with a communication protocol that is a Universal Serial Bus (USB) protocol, an Ethernet protocol, an Integrated Interchip Sound (I2S) protocol (or Inter-IC Sound protocol), a Peripheral Component Interconnect Express (PCIe) protocol, or a DisplayPort (DP) protocol.

24. The method of claim 17, wherein a first communication protocol associated with the first protocol-compliant data signal and a second communication protocol associated with the second protocol-compliant data signal are the same.

25. The method of claim 17 further comprising communicating, by the first protocol bridge element, with the first EHF communication unit through one or more communication channels provided over one or more signal paths.

* * * * *